(12) United States Patent
Nguyen

(10) Patent No.: US 6,958,870 B1
(45) Date of Patent: Oct. 25, 2005

(54) COLOR WHEEL WITH BALANCING GROOVE FOR SECURELY HOLDING A BALANCING MEDIUM

(75) Inventor: Hung Xuan Nguyen, Santa Rosa, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 11/017,460

(22) Filed: Dec. 20, 2004

(51) Int. Cl.[7] .............................. G02B 5/22; G02B 7/00
(52) U.S. Cl. ...................... 359/892; 359/891; 359/885; 348/743; 356/418; 353/84; 362/293
(58) Field of Search ................. 359/891, 892, 359/885; 348/743; 356/418; 353/84; 362/292, 362/293

(56) References Cited

U.S. PATENT DOCUMENTS

| | | | |
|---|---|---|---|
| 5,371,543 A | 12/1994 | Anderson | |
| 5,868,482 A | 2/1999 | Edlinger et al. | |
| 6,024,453 A | 2/2000 | Edlinger et al. | |
| 6,598,977 B1 | 7/2003 | Chen | |
| 6,604,830 B1 | 8/2003 | Chiu et al. | |
| 6,618,214 B2 | 9/2003 | Sung et al. | |
| 6,705,733 B1 | 3/2004 | Yu et al. | |
| 6,715,887 B2 | 4/2004 | Chang | |
| 6,747,803 B2 | 6/2004 | Hung | |
| 6,769,775 B2 | 8/2004 | Chin et al. | |
| 6,769,776 B1 | 8/2004 | Chen et al. | |
| 2003/0035218 A1 | 2/2003 | Hung | |
| 2004/0045397 A1* | 3/2004 | Chang | ...................... 74/573 R |
| 2004/0046945 A1 | 3/2004 | Chang | |
| 2005/0099712 A1* | 5/2005 | Kao et al. | .................... 359/892 |

* cited by examiner

Primary Examiner—Leonidas Boutsikaris
(74) Attorney, Agent, or Firm—Allen, Dyer, Doppelt, Milbrath & Gilchrist, P.A.

(57) ABSTRACT

A color wheel is disclosed having balancing groove. The color wheel includes a carrier, having a central axis about which it is rotated. An external surface and a periphery rotates along the central axis; a color filter plate shares a same central axis with the carrier, wherein an annular groove is disposed on the external surface of the carrier. The groove is shaped, for example in a wedge so that once a balancing substance such as epoxy is added into the annular groove to balance the color wheel, it becomes lodged therein after curing as the opening is smaller than the cured epoxy.

9 Claims, 4 Drawing Sheets

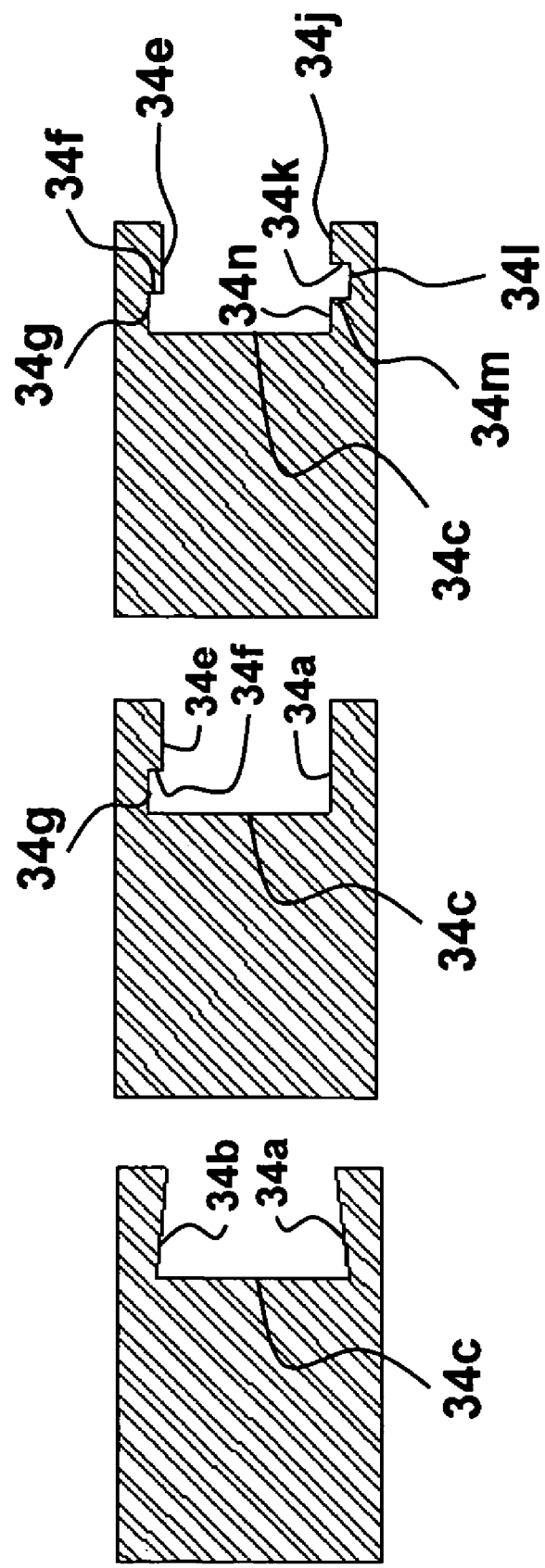

COLOR WHEEL WITH BALANCING GROOVE FOR SECURELY HOLDING A BALANCING MEDIUM

FIELD OF THE INVENTION

This invention relates to a color wheel for use in a projection system, and more particularly relates to a system for balancing the color wheel.

BACKGROUND OF THE INVENTION

The prior art of balancing a color wheel is directed to two primary methods; the first method is to apply adhesive materials onto a motor or the carrier or to a groove in the carrier of a color wheel. The second method is to drill holes on the carrier in order to balance the color wheel, but difficulties are associated with the second method in controlling the exertion of force, and thus may easily cause damage to the bearing; furthermore, metal powder or particles may contaminate and scrape the coating surface of the color wheel itself, thereby causing defects. In an attempt to solve the shortcomings of this prior art U.S. Pat. No. 6,747,803 incorporated herein by reference in the name of Hung discloses a color wheel that forms a annular groove at the position originally intended for the drilling holes on the external surface of the carrier, so that when the color wheel has an unbalanced rotation, a balancing material, such as glue, is filled into the annular groove instead of drilling holes to attain the effect of balancing the color wheel.

U.S. Pat. No. 6,705,733 incorporated herein by reference to Yu et al. also discloses a system wherein a groove in a washer that rotates with the color wheel is used in a similar manner wherein an adhesive material is placed in the groove to balance the color wheel.

Applying adhesive material to a U shaped or parallel channeled groove within a carrier or washer works adequately, as long as the adhesive remains in the groove. It has been found however, that the adhesive material is subject to a centrifugal force due to the rotary motion of the washer or disk used for balancing and in some instances becomes loose and dislodges from the groove, thereby leaving the color wheel unbalanced.

Therefore, it is an object of this invention to provide a carrier wheel having a groove with a shape that prevents adhesive counter balance applied thereto, or therein, from dislodging and being forced out of the groove as it spins. The shape of the groove is designed to hold the cured adhesive during all normal use while the color wheel is spinning.

It is an object to of the invention to provide a simple and inexpensive solution to the problem of the counter balance becoming dislodged, associated with the prior art.

SUMMARY OF THE INVENTION

In accordance with the invention, a color wheel assembly is provided, comprising a motor for rotating a color wheel about a rotational central axis thereof, and a circular disk having a groove about its periphery sharing a same axis of rotation, the groove having a cross section defining an opening having a bottom face and at least two non-parallel faces that prevents a cured material filling the opening from being removed when subjected to the centrifugal force.

In accordance with the invention, there is further provided, a color wheel comprising a motor for driving a disc having an outer rim, the disc having a groove therein with an inner surface with a predetermined cross-sectional shape, and a cured counter balance material at a location within the groove on the inner groove surface of the disc for balancing the color wheel, wherein the cross section of the groove is such that:

the side walls are not parallel, or the side walls have regions therein for preventing the cured counter balance material from falling out of the groove or, a width at an end of the groove which is open is smaller than the width at a location within the groove.

In accordance with the invention there is further provided, a color wheel comprising a motor for driving a disc having an outer rim, the disc having a groove therein with an inner surface with a predetermined cross-sectional shape, and a cured counter balance material at a location within the groove on the inner groove surface of the disc for balancing the color wheel, wherein the cross section of the groove is such that an abutment is present within the groove to prevent cured counter balance material from dislodging from the groove.

BRIEF DESCRIPTION OF THE DRAWINGS

Exemplary embodiments of the invention will be described in accordance with the invention is which:

FIG. 3c is an alternative embodiment wherein the cross-section of the groove is wedged shaped.

FIG. 3d is an alternative embodiment wherein the cross section has a larger opening at the bottom of the groove than it does at its mouth or opening.

FIG. 3e is an alternative embodiment wherein a more complex cross section is shown wherein cut-out sections provide abutments which hold in cured adhesive such as epoxy

DETAILED DESCRIPTION

Figure 2:
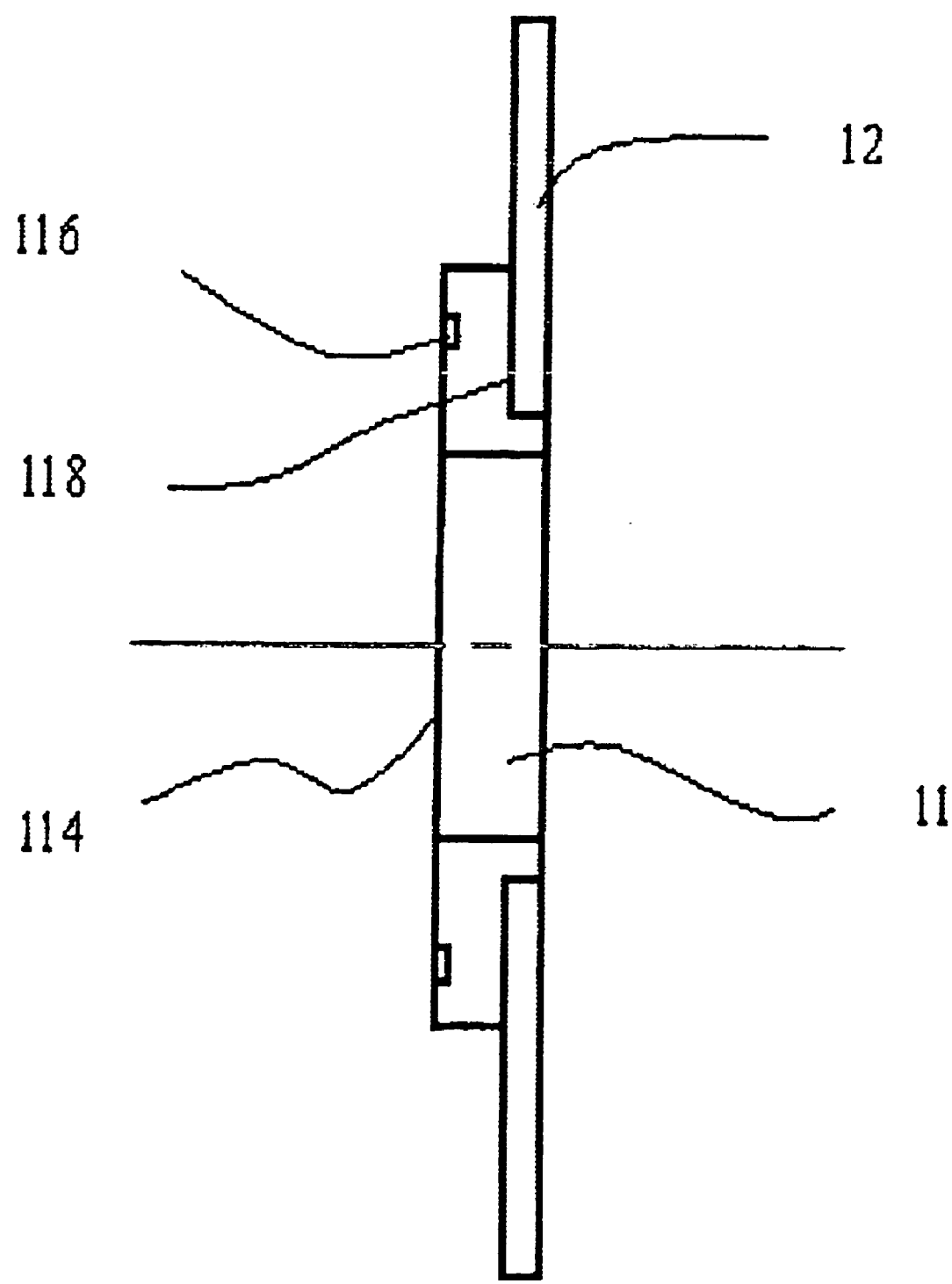
FIG. 2 is a prior art color wheel having a groove in a carrier for receiving a counter balancing adhesive.

Turning now to prior art FIG. 2 a color wheel 1 having a carrier 111n the shape of a circular disc is shown. Color filter 12 is mounted on the carrier 11. The color wheel is installed to rotate about a central axis 10 rotated by a motor 2. An annular groove 116 is disposed on the surface in which balancing adhesive may be applied. The groove is shown to be a square U-shaped channel.

Figure 1:
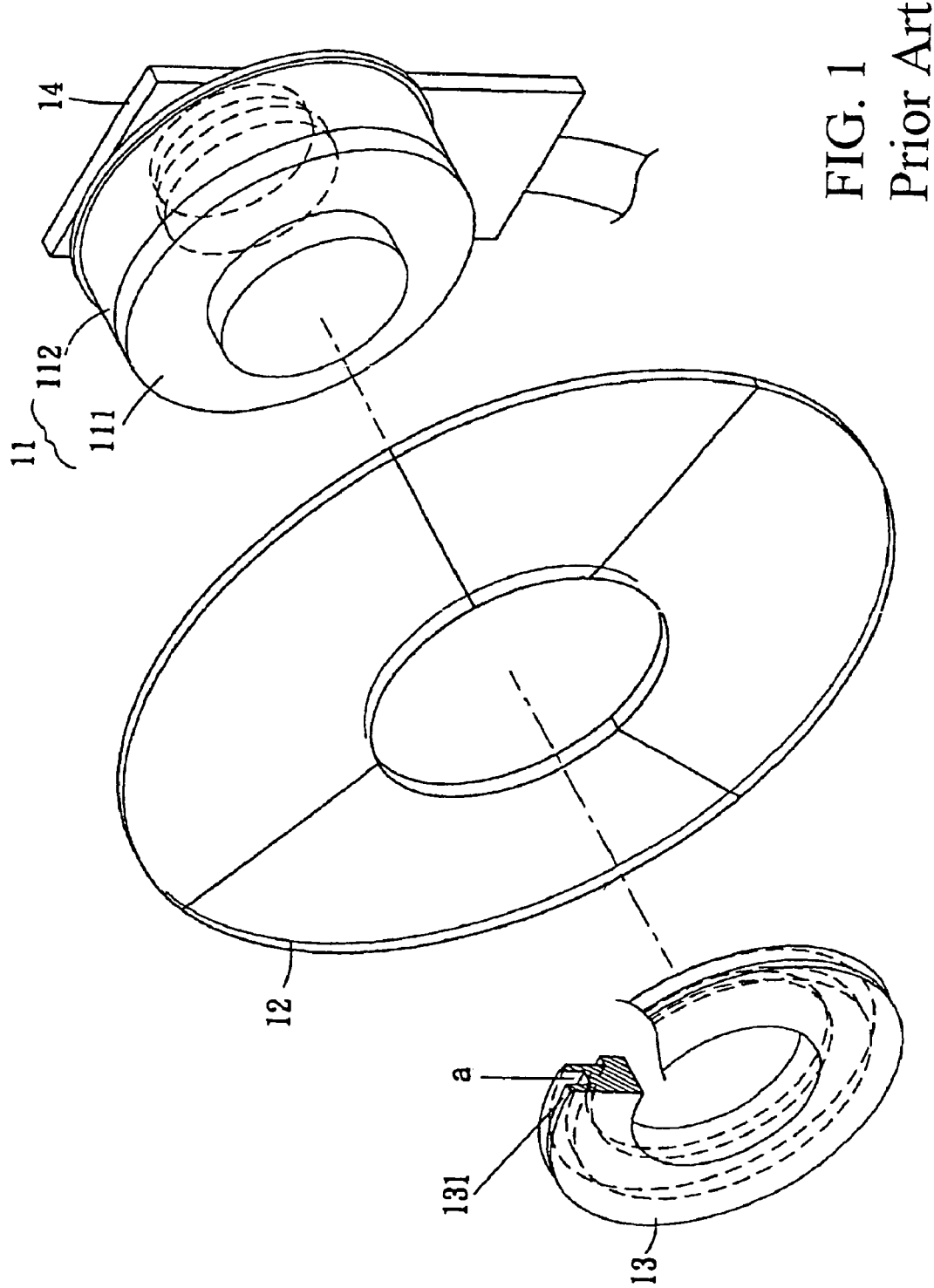
FIG. 1 is a prior art color wheel having a washer with a groove for receiving a balancing adhesive.

A similar system is shown in FIG. 1 wherein a color wheel 1 includes a motor 11, a color filter 12 and a washer 13. The color filter 12 is set on the motor 11. The washer is set both on the color filter and the motor. As the color filter rotates, the washer rotates with it. The washer surface 131 has a groove marked with the letter a. In FIG. 3 of U.S. Pat. No. 6,705,733 the groove (shown as letter a) is shown in more detail and is a square U-shaped groove having two parallel inner faces. Because the groove is U-shaped, when the wheel spins centrifugal forces act upon the adhesive bonded therein and the adhesive can come away from the surface it was bonded to and fly-off, upsetting the balance of the color wheel.

Figures 3A, 3B:
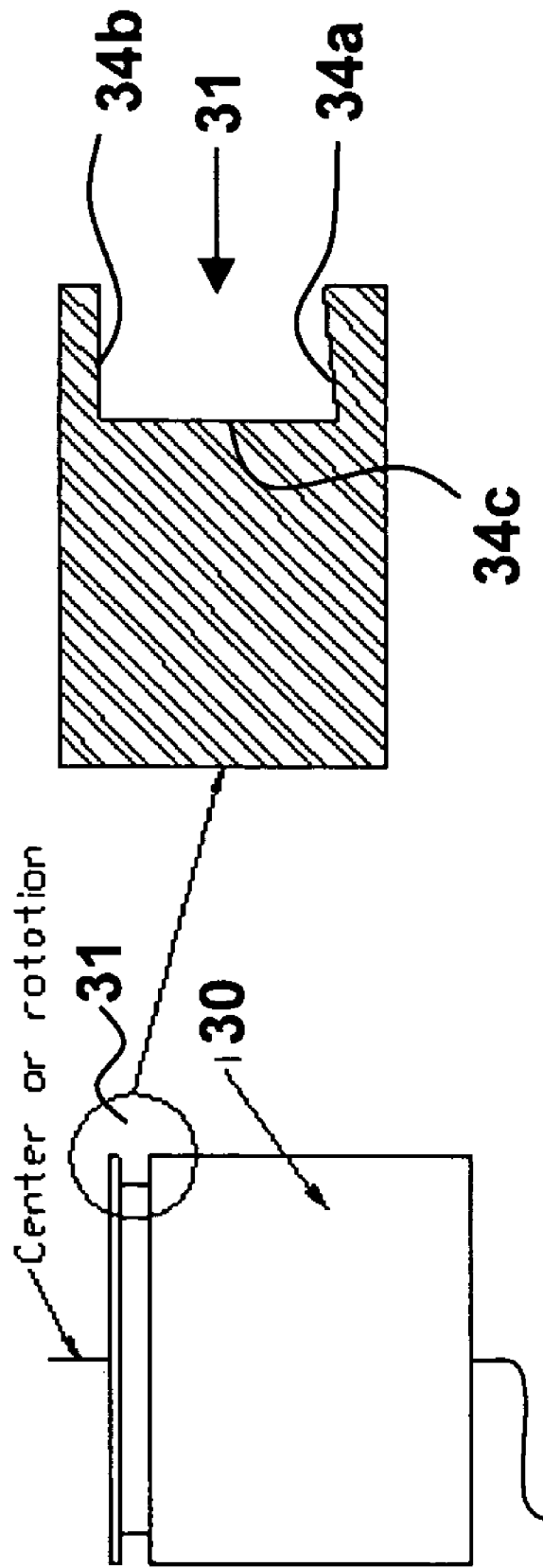
FIG. 3a is a side view of a color wheel in accordance with an embodiment of the invention, wherein a rotor with a carrier mounted about its center of rotation is shown to have a groove about its outer periphery that has non-parallel inner side walls.
FIG. 3b is an enlarged view of the groove in the carrier showing inner walls which are non-parallel.

Turning now to FIGS. 3a and 3b, a rotor 30 is shown having a centre of rotation 32 and having a groove 31 in an upper surface shown as an enlarged view in FIG. 3b to have non-parallel inner walls. Inner wall denoted by reference numeral 34a and inner wall denoted by 34b are non parallel to one another, and the inner most wall 34c of the groove is not parallel to either 34a or 34b. Advantageously, due to the slant of the wall 34a when adhesive placed therein cures, it cannot become dislodged from the groove. The slanted wall serves as an abutment preventing dislodging of the adhesive. The adhesive is held in since the adhesive adjacent the wall 34c occupies a large region than the opening or mouth of the groove between 34a and 34b will allow passing through, thus the adhesive is locked in after it cures and cannot inadvertently fall out or even be pulled out by centrifugal forces when spinning. A color wheel is mounted on top of the grooved part of the rotor, such that the color wheel spins with the rotor, driven by a motor, similar to the embodiments shown in FIGS. 1 and 2. Grooves of various other shapes can be envisaged and do not depart from the spirit and scope of this invention. By way of example FIG. 3c illustrates a more symmetrical structure wherein two slanted inner walls 34a and 34b are shown having a flat back wall, or bottom, 34c. A common aspect in all of the embodiments shown in FIGS. 3b through 3e is that once adhesive is filled into the groove at a preferred location and cures, it cannot fall out, even if it the adhesive has a low bond strength, as long as it cures and completely hardens. The adhesive or epoxy becomes completely trapped within the structure formed by the groove.

In all of the embodiments shown the groove has a cross section defining an opening having a bottom 34c and at least two non-parallel faces 34a, 34b that prevents a cured material filling the opening from being removed in an instance wherein the cured material is subjected to the centrifugal force. FIG. 3d shows an embodiment wherein a groove is formed from side face 34a, bottom face 34c, and an inside face comprising faces 34e, 34f, and 34g. When the opening of the groove is filled with adhesive which cures, face 34f provides a means of securing the adhesive counter balance abutting, even if the bond is on its own inadequate to hold the counter balance in place.

Referring now to FIG. 3e an alternative embodiment is shown wherein a more complex cross-section of a groove is shown having grooves within the groove suitable for preventing cured epoxy or UV cured adhesive from falling out. A bottom face 34c is shown, and a side face with faces 34e, 34f, and 34g are show as in FIG. 3d. Notwithstanding, the opposing side of the groove has a first face 34h, a next face 34i, adjacent a portion 34j and 34k followed by 34l, 34m, and 34n. By providing notches within the groove, once adhesive 45 is applied, it becomes locked within the groove notched structure.

In each of the embodiments shown and described, an abutment is present within the groove which prevents complete dislodging of the cured adhesive. In all of these embodiments, even if the counterbalance material placed in the groove is a low strength adhesive, it would remain within the groove after curing.

In summary, this invention provides a groove within an outer periphery of a color wheel or its mount, or a washer which moves with the color wheel, wherein the groove has a shape that will prevent cured counter balance material such as an adhesive, for example an epoxy or UV cured adhesive from becoming dislodged from the groove even when the adhesive has low bond strength.

What is claimed is:

1. A color wheel comprising a motor for rotating a color filter about a rotational central axis thereof, and a circular disk having a groove about its periphery sharing a same axis of rotation with the color filter, the groove having a cross section defining an opening having a bottom face and at least two non-parallel faces which prevent a cured material filling the opening from being removed when the circular disc is rotated.

2. A color wheel as defined in claim 1, wherein one of the two non-parallel faces of the is at right angles to the bottom face, and wherein the other of the two non-parallel faces is at an angle other than 90 degrees with the bottom face.

3. A color wheel as defined in claim 1, wherein a width of the opening, is smaller than a width of the bottom face.

4. A color wheel as defined in claim 1, wherein the cross section of the groove has one or more projections projecting into the opening.

5. A color wheel as defined in claim 1 wherein the cross section of the groove has one or more slots within the opening having a smaller dimension than the opening.

6. A color wheel as defined in claim 1 wherein the groove has at least an inner wall having a groove therein.

7. A color wheel, comprising a disc drivable by a motor, the disc having an outer rim, the outer rim having a groove therein with an inner surface with a predetermined cross-sectional shape,
   a cured counter balance material at a location within the groove of the disc for balancing the color wheel, wherein the cross section of the groove is such that an abutment is present within the groove to prevent cured counter balance material from dislodging from the groove; and, one or more color filters mounted to rotate as the disc rotates when driven by the motor, wherein the groove has inner non parallel sidewalls.

8. A color wheel as defined in claim 7 wherein the groove has inner side walls, and wherein at least one of the side walls has a groove defined therein.

9. A color wheel as defined in claim 8, wherein the groove within the inner sidewall forms the abutment.

\* \* \* \* \*